United States Patent
Su et al.

(10) Patent No.: US 9,538,044 B2
(45) Date of Patent: Jan. 3, 2017

(54) APPARATUS AND METHOD FOR DATA DECODING

(71) Applicant: KYOCERA Document Solutions Inc., Osaka (JP)

(72) Inventors: Dongpei Su, El Segundo, CA (US); Kenneth A. Schmidt, El Segundo, CA (US); Thien-Phuc Nguyen Do, El Segundo, CA (US); Sheng Li, El Segundo, CA (US)

(73) Assignee: KYOCERA Document Solutions Inc. (JP)

( * ) Notice: Subject to any disclaimer, the term of this patent is extended or adjusted under 35 U.S.C. 154(b) by 102 days.

(21) Appl. No.: 14/664,335

(22) Filed: Mar. 20, 2015

(65) Prior Publication Data

US 2016/0286083 A1    Sep. 29, 2016

(51) Int. Cl.
*H03M 7/40* (2006.01)
*H04N 1/411* (2006.01)
*H04N 19/129* (2014.01)
*H04N 19/124* (2014.01)
*H04N 19/176* (2014.01)
*H04N 19/91* (2014.01)

(52) U.S. Cl.
CPC .......... *H04N 1/4115* (2013.01); *H04N 19/124* (2014.11); *H04N 19/129* (2014.11); *H04N 19/176* (2014.11); *H04N 19/91* (2014.11); *H04N 2201/0094* (2013.01)

(58) Field of Classification Search
CPC .... H04N 1/4115; H04N 19/91; H04N 19/124; H04N 19/129; H04N 19/176; H04N 2201/0094
USPC .................................................. 341/67, 106
See application file for complete search history.

(56) References Cited

U.S. PATENT DOCUMENTS

| | | | | |
|---|---|---|---|---|
| 8,406,307 B2* | 3/2013 | Tu | ......................... | H04N 19/176 341/67 |
| 8,457,419 B2* | 6/2013 | Lamb | ..................... | H04N 19/60 341/63 |
| 9,374,602 B2* | 6/2016 | Lee | ........................ | H04N 19/91 |
| 9,413,387 B2* | 8/2016 | Fenney | ............... | H03M 7/6023 |

OTHER PUBLICATIONS

International Telecommunication Union, CCITT Terminal Equipment and Protocols for Telematic Services, Information Technology—Digital Compression and Coding of Continuous-Tone Still Images—Requirements and Guidelines, Recommendation T.81, Sep. 18, 1992.

* cited by examiner

*Primary Examiner* — Brian Young
(74) *Attorney, Agent, or Firm* — McDonnell Boehnen Hulbert & Berghoff LLP

(57) ABSTRACT

A computer-implemented method comprises receiving a data stream that includes a series of code words that encodes a respective series of pixel data according to a first entropy coding lookup table, and processing the data stream to determine if there is a match between a first code word and a consecutive second code word, and a code word entry in a second entropy coding lookup table. The method also includes, if there is a match, decoding the first code word and the second code word using the second entropy coding lookup table. Further, the method includes, if there is not a match, decoding the first code word using the first entropy coding lookup table.

20 Claims, 6 Drawing Sheets

Figure 9

APPARATUS AND METHOD FOR DATA DECODING

BACKGROUND

In recent years, various types of printing devices have become popular for both business and consumer use. In addition to traditional black and white printers, color printers, scanners, copiers, fax machines, and other components are now common. Multi-function peripherals (MFPs), that support two or more of these functions, are also widely available. Among other functions, these devices are used to process image data.

The processing of image data may include, for instance, compressing and encoding operations, and/or decompressing and decoding operations. One example image processing technology is defined by the Joint Photographic Experts Group (JPEG) standard. Generally, a JPEG encoding process of image data includes spatial frequency conversion, quantization, data sequencing, and entropy encoding; and a JPEG decoding process of image data includes an inverse of the JPEG encoding processes, such as entropy decoding, inverse data sequencing, de-quantization, and inverse spatial frequency conversion.

It is desirable to improve on the arrangements of conventional methods and systems or at least to provide one or more useful alternatives to help to make data processing more efficient, reliable, and faster.

SUMMARY

In an example embodiment, a computer-implemented method comprises receiving, by a computing device, a data stream that includes a series of code words that encodes a respective series of pixel data according to a first entropy coding lookup table; and processing, by the computing device, the data stream to determine if there is a match between a first code word and a second code word, and a code word entry in a second entropy coding lookup table. In this example, the first code word and the second code word are consecutive code words in the data stream, and the second entropy coding lookup table is different than the first entropy coding lookup table. This example method also includes, if there is a match between the first code word and the second code word, and a code word entry in the second entropy coding lookup table, decoding, by the computing device, the first code word and the second code word using the second entropy coding lookup table. Further, this example method includes, if there is not a match between the first code word and the second code word and a code word entry in the second entropy coding lookup table, decoding, by the computing device, the first code word using the first entropy coding lookup table.

In another example embodiment, a system for decoding a data stream comprises an input buffer for receiving the data stream that includes data encoded into a series of code words according to an entropy coding lookup table, and a processor coupled to the input buffer. In this example, the processor is configured to determine if consecutive code words in the data stream correspond to a run of zero followed by a run of zero or a run of one and to, if the consecutive code words correspond to a run of zero followed by a run of zero or a run of one, provide an output based at least in part on decoding the consecutive code words using a modified entropy coding lookup table. Further, in this example, the processor is configured to, if the consecutive code words do not correspond to a run of zero followed by a run of zero or a run of one, provide the output based at least in part on decoding a first code word of the consecutive code words using the entropy coding lookup table.

In a further example embodiment, a non-transitory computer-readable medium has stored thereon program instructions that, upon execution by a processor cause performance of a set of acts comprising receiving, by a computing device, a data stream that includes a series of code words that encodes a respective series of pixel data according to a first entropy coding lookup table; and processing the data stream to determine if there is a match between a first code word and a second code word, and a code word entry in a second entropy coding lookup table. In this example, the first code word and the second code word are consecutive code words in the data stream, and the second entropy coding lookup table is different than the first entropy coding lookup table. In this example, the set of acts also includes, if there is a match between the first code word and the second code word, and a code word entry in the second entropy coding lookup table, decoding the first code word and the second code word using the second entropy coding lookup table. Further, in this example, the set of acts includes, if there is not a match between the first code word and the second code word and a code word entry in the second entropy coding lookup table, decoding the first code word using the first entropy coding lookup table.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION OF THE DRAWINGS

Figure 1:
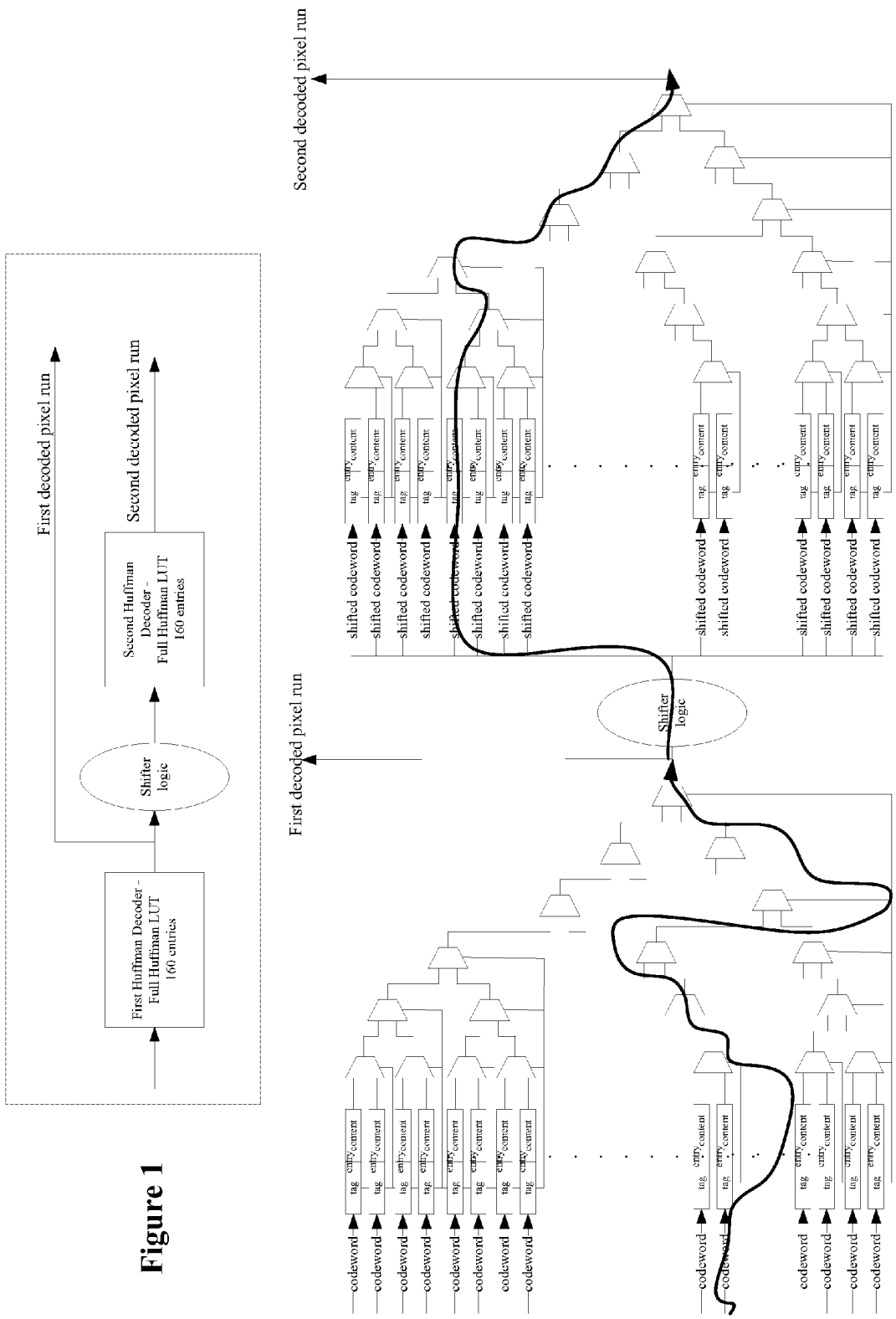
FIG. 1 depicts a diagrammatic block and processing diagram of a conventional cascaded Huffman decoder.

Example methods and systems are described herein. Other example embodiments or features may further be utilized, and other changes may be made, without departing from the spirit or scope of the subject matter presented herein. In the following detailed description, reference is made to the accompanying figures, which form a part thereof.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. For illustration purposes, features and functions are described with respect to printing devices and processing of image data. However, the features and functions disclosed herein may also be applicable to other types of computing devices (e.g., display devices), components of computing devices (e.g., data decoders, processors, storage components, and the like), and to processing other types of data (e.g., audio data and/or video data).

1. Introduction

Printing technology has evolved over the last 30-plus years from simple dot-matrix-based output devices producing only black and white images to today's advanced laser-based printing devices that can produce high-resolution color images. Additionally, modern printing devices may also function as copiers, scanners, and fax machines. To do so, they may be able to store image data for numerous electronic documents that are queued for printing or faxing, or that have been scanned. Thus, many printing devices are specialized forms of computing devices that may include, for example, one or more processors, data storage, and input/output interfaces.

Regardless of whether a printing device is used in a residence, a business, or in another type of location, the printing device may be a shared resource that can be communicatively coupled to various other computing devices. Consequently, in some environments, the storage and processing requirements of a printing device may be quite high, as numerous computing devices may be transmitting electronic documents to the printing device for printing. Typically, a printing device will print, copy, fax, and/or scan one electronic document at a time, in a first-come-first-served fashion. Therefore, the printing device may store a potentially large number of electronic documents that are waiting to be serviced. Since the cost of data storage (e.g., memory such as random access memory (RAM), solid-state memory, hard-drive memory, and/or flash memory) can be expensive, it may be beneficial to compress the stored electronic documents, in order to reduce the data storage requirements of the printing device. Additionally, since some electronic documents may be transferred to and/or from the printing device and a computing device, compressing these electronic documents may make transfers faster and use less network capacity.

Moreover, since print jobs may be large (e.g., a print job may include one or more electronic documents encompassing hundreds of pages), compressing queued print jobs in the queue saves short-term storage space before each job is printed. In addition, users may want to save print jobs in long-term storage for printing at a later time. Thus, compressing print jobs may allow more print jobs to be saved. Furthermore, the act of storing and retrieving large print jobs from long-term memory can be slow, but it may be expedited by compressing the print jobs to make them smaller in size.

One technique for compressing and subsequently decompressing print jobs (and other types of data) utilizes entropy coding. Huffman coding is one example of entropy coding that is commonly used to compress image data, video data, audio data, and the like. Generally, Huffman coding encodes symbols (e.g., pixel data, DCT coefficients, audio data, and the like) with variable-length binary code or code words that are assigned in accordance with statistical probabilities. For instance, more frequently used symbols are assigned codes that may be only a couple of bits in length, and less frequently used symbols are assigned codes that are increasing numbers of bits in length (e.g., up to 16 bits in length). Huffman coding uses a lookup table that lists each possible variable length code to encode and decode data. One example Huffman table is provided in the JPEG standard (ISO/IEC 10918) at Table K.5, and which is also attached hereto in the appendix (the "JPEG Huffman lookup table"). Other example Huffman tables are also possible and within the scope of the present disclosure.

Because Huffman coding uses variable-length codes, decoding a stream of Huffman-encoded data is sequential in nature, such that each code in the stream of data is determined before a next code is determined. Conventional decoders operate at one code per clock rate or cycle. Commonly, each Huffman code contains multiple pixels so that an average decompression rate of pixels per clock rate is suitably high. However, some applications require a guaranteed pixel throughput (e.g., two pixels per clock), and the transient worst-case, low-pixel rate of one pixel per clock can cause data under-run and image artifacts. In practice, the potential for less than two pixel/clock throughput is more likely in very noisy areas of an image, for example.

Conventional attempts to guarantee a two pixel/clock throughput have various shortcomings. In one approach, two cascaded Huffman decoders can decode at least two pixels/clock, but this throughput comes at the cost of doubling the critical path delay of the processing logic. Referring to FIG. 1, for example, cascading a first Huffman decoder with a second Huffman decoder essentially doubles the critical path delay due to processing a data stream using two full Huffman lookup tables, which essentially cuts in half the maximum processing frequency. In the case of the 160 entry Huffman lookup table that is commonly used in JPEG processing, the relatively large Huffman lookup table limits the maximum clock frequency at which the cascaded decoders can run.

In another approach, parallel Huffman decoders are used to decode at least two pixels/clock. However, this approach uses additional data buffers and dynamic memory allocation to generate separate data streams for the parallel Huffman decoders. Depending on the computing device that is being used to decode the data stream, such additional data buffers may not be available. In addition, the use of additional data buffers and dynamic memory allocation in this context can increase memory fragmentation and increase processing latency.

The present disclosure provides reliable and efficient approach to guarantee an average two pixel/clock decoding throughput (e.g., a four-pixel per two-clock cycle throughput). The disclosed approach utilizes a modified Huffman lookup table to decode an encoded data stream. Referring to the relatively large JPEG Huffman lookup table, only ten of the entries correspond to a run of zero. Generally, the run length corresponds to the length of run of zero amplitude AC coefficients. In this context, a run of zero means that there is no zero amplitude AC coefficient in between the last (decoded) AC coefficient and the next non-zero AC coefficient, a run of one means that there is one zero amplitude AC coefficient followed by one non-zero amplitude AC coefficient, a run of two means that there are two zero amplitude AC coefficients followed by one non-zero amplitude AC coefficient, and a run of an integer (n) means that there are n zero amplitude AC coefficients followed by one non-zero amplitude AC coefficient.

The run of zero code words in the JPEG Huffman lookup table (and other variable or fixed length encoding tables) are the only cases where there would be a need to decode faster than one code word per clock to guarantee a two pixel/clock throughput. This is because throughput for runs of one amount to a two pixel/clock decoding rate (the zero amplitude AC coefficient pixel and the one non-zero amplitude AC coefficient pixel), runs of two amount to a three pixel/clock decoding rate, runs of three amount to a four pixel/clock decoding rate, and runs of n amount to an (n+1) pixel/clock decoding rate.

The present disclosure uses a modified coding lookup table that cascades the entries of the full lookup table corresponding to a run of zero with entries of the full lookup table corresponding to a run of zero or a run of one. The resulting modified coding lookup table enables the decoder to decode two code words in one clock cycle, without cascading the entire full lookup table, as in conventional techniques. In short, when the current code word corresponds to one pixel, and the next code word corresponds to one or two pixels, these consecutive code words are decoded together using the modified coding lookup table. Otherwise, one code word (runs of two or more correspond to three or more pixels) can be decoded per clock cycle without reducing the throughput rate below two pixels/clock.

Compared with the cascaded decoder, discussed above, this approach of using a modified coding lookup table in addition to and in parallel with the full lookup table requires about the same amount of circuitry and logic (e.g., by having 200 more entries in the lookup table). However, since the code word pair decoding happens in parallel with the normal decoding process, in contrast to the serial decoding as in cascaded decoder, the disclosed approach is inherently faster.

2. Example Printing Device

Figure 2:
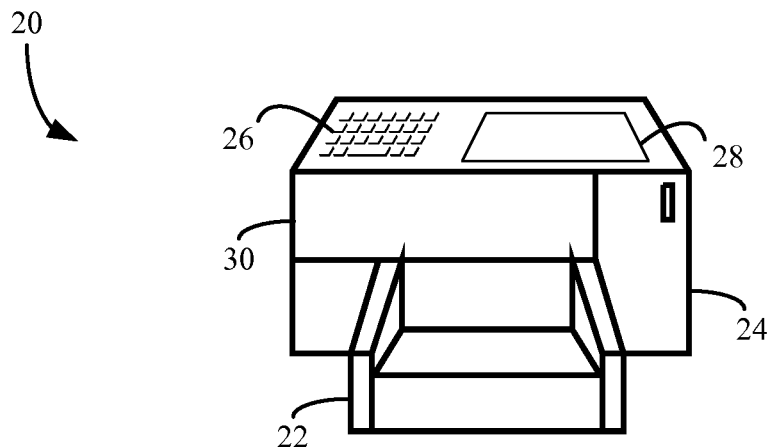
FIG. 2 depicts a computing device, according to an example embodiment.

FIG. 2 depicts an example printing device 20. Printing device 20 may be configured to print partially-stored and/or fully-stored electronic documents on various types of physical output media. These output media include, but are not limited to, various sizes and types of paper, overhead transparencies, and so on. Printing device 20 may be interchangeably referred to as a "printer."

Printing device 20 may serve as local peripheral to another computing device, such as a personal computer, a display monitor, a server device, a print server, and the like. In these cases, printing device 20 may be attached to the computing device by cable, such as a serial port cable, parallel port cable, Universal Serial Bus (USB) cable, Firewire (IEEE 1394) cable, or High-Definition Multimedia Interface (HDMI) cable. Thus, the computing device may serve as a source of electronic documents for printing device 20.

On the other hand, printing device 20 may include a wireline or wireless network interface, such as an Ethernet or IEEE 802.11 (WLAN or Wi-Fi) interface. So arranged, printing device 20 may serve as a printing device for any number of computing devices that can communicate with printing device 20 over a network. In some embodiments, printing device 20 may serve as both a local peripheral and a networked printer at the same time. In order to use printing device 20, computing devices may install one or more printer drivers. These printer drivers may include software components that convert the image data representing electronic documents to be printed from various local representations stored on the computing devices to one or more representations supported by printing device 20. Regardless, printing device 20 may be considered to be a computing device, and may carry out both printing-related and non-printing related tasks.

As noted above, printing device 20 may also include copier, fax, and scanner functions. In some embodiments, printing device 20 may use a scanner function to facilitate copier and/or fax functions. For instance, printing device 20 may scan a physical document into an electronic format, and then print the resulting electronic document to provide a copy, and/or transmit the resulting electronic document via a telephone interface to provide a fax function.

In order to support its various functions, printing device 20 may include a document feeder/output tray 22, paper storage 24, user interface 26, scanning element 28, and chassis 30. It should be understood that printing devices may take on a wide variety of forms. Therefore printing device 20 may include more or fewer components than depicted in FIG. 1, and/or components arranged in a different fashion than depicted in FIG. 1.

Document feeder/output tray 22 may hold physical documents (e.g., a stack of one or more sheets of paper) that are to be scanned, copied or faxed. Document feeder/output tray 22 may allow printing device 20 to automatically feed multiple physical documents for processing by printing device 20 without requiring manual intervention. Document feeder/output tray 22 may also include one or more separate output trays for holding physical documents that have been processed by printing device 20. These may include physical documents that have been scanned, copied, or faxed by printing device 20, as well as physical documents that have been produced by the fax and/or copying functions, for example, of printing device 20.

Paper storage 24 may include trays and/or feeding elements for various types of physical media. For instance, paper storage 24 may include separate trays for 8½×11 inch paper, A4 paper, letterhead paper, envelopes, and so on. For any function of printing device 20 that involves producing physical media (e.g., printing, copying, and/or receiving a fax), paper storage 24 may supply the physical media.

User interface 26 may facilitate the interaction of printing device 20 with a human or non-human user, such as to receive input from a user and to provide output to the user. Thus, user interface 26 may include input components such as a keypad, keyboard, touch-sensitive or presence-sensitive panel, joystick, microphone, still camera and/or video camera. User interface 26 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. User interface 26 may also be configured to be able to generate audible output(s), via a speaker, speaker jack, audio output port, audio output device, earphones, and/or other similar devices, now known or later developed in the future.

Scanning element 28 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with printing device 20.

Chassis 30 may include a physical housing that contains and or interconnects various components of printing device 20, such as document feeder/output tray 22, paper storage 24, user interface 26, and scanning element 28. Additionally, chassis 30 may house other components not shown in FIG. 1. For example, chassis 30 may contain one or more toner cartridges, liquid ink jets, belts, rollers, and/or power supplies. Further, chassis 30 may include communication interfaces, such as a wireline and/or wireless network interfaces, a telephony interface (e.g., a RJ45 jack), a USB interface, a BLUETOOTH® interface, a card reader port, etc.

Moreover, as printing device 20 may be based on general-purpose and/or specially-designed computing device components, chassis 30 may also house some or all of these components. For instance, the printing device 20 may include a processor and data storage (not explicitly shown). Generally, the processor may include one or more central processing units (CPUs), such as one or more general purpose processors and/or one or more dedicated processors (e.g., application specific integrated circuits (ASICs) or digital signal processors (DSPs), etc.). The data storage may include volatile and/or non-volatile data storage and can be integrated in whole or in part with processor. The data storage may store program instructions, executable by processor, and data that are manipulated by these instructions to carry out the various methods, processes, or functions described herein. Alternatively, these methods, processes, or functions can be defined by hardware, firmware, and/or any combination of hardware, firmware and software. Therefore, the data storage may include a tangible, non-transitory computer-readable medium, having stored thereon program instructions that, upon execution by one or more processors, cause printing device 20 to carry out any of the methods, processes, or functions disclosed in this specification or the accompanying drawings.

Further, the components of the printing device 20 may also include hardware and/or software components for compressing/encoding and/or decompressing/decoding image data.

3. Example Encoder and Decoder

Figure 3:
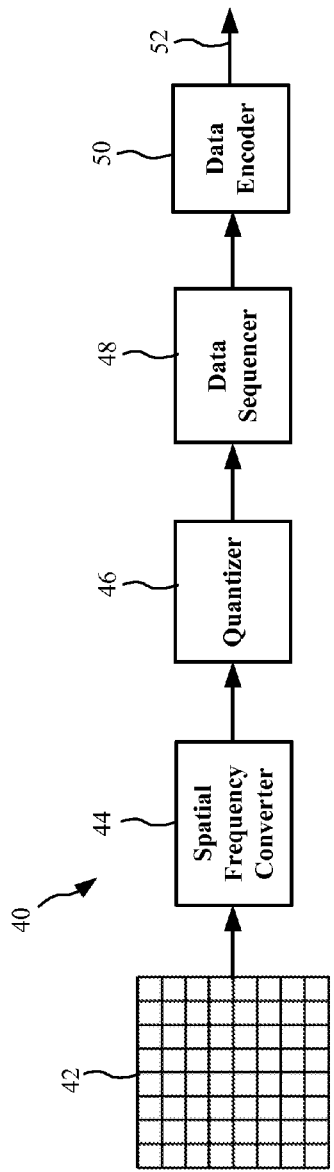
FIG. 3 is a block diagram illustrating data processing components of a computing device, according to an example embodiment.
Figure 4:
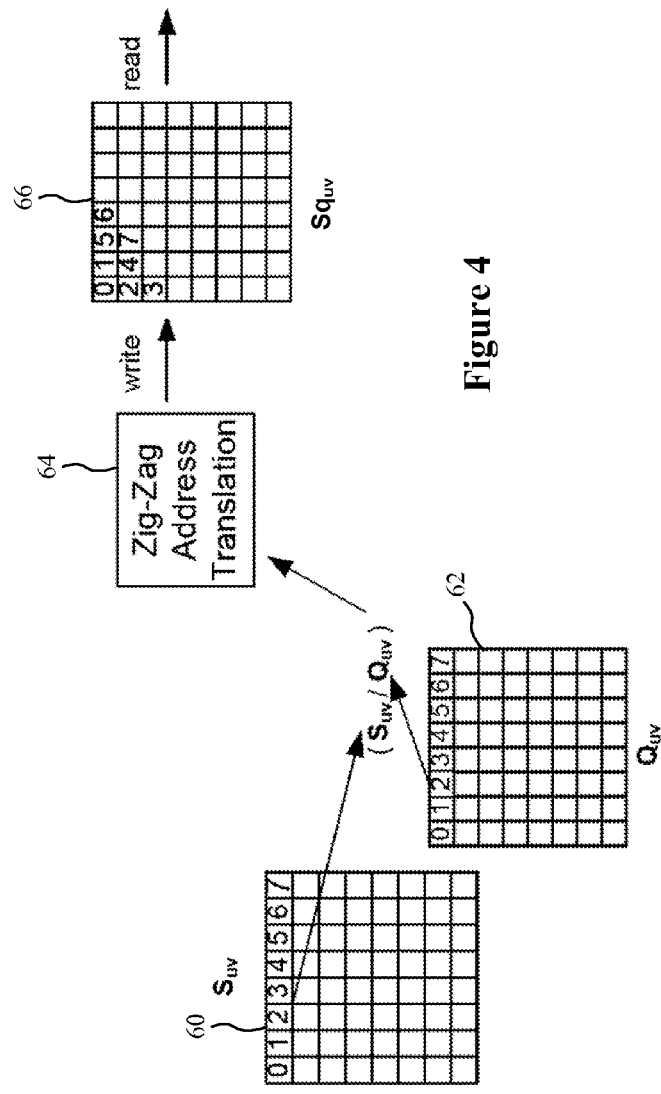
FIG. 4 is a block diagram illustrating storage components and data for use in image processing, according to an example embodiment.
Figure 6:
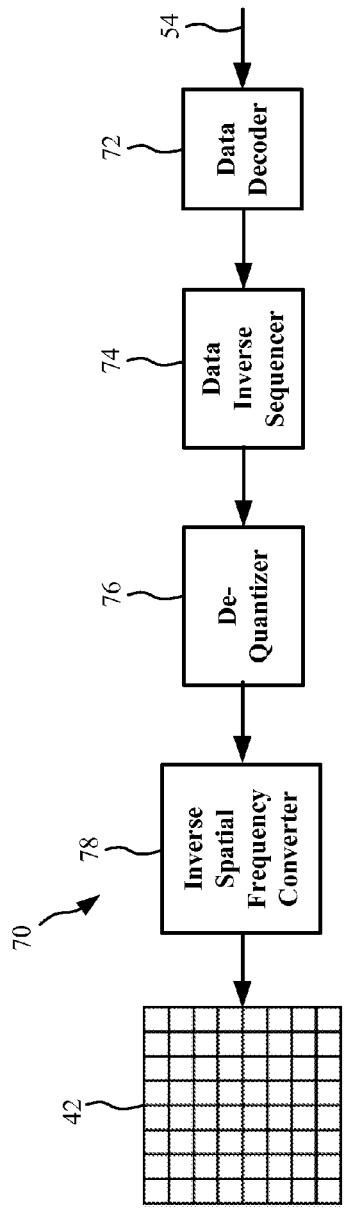
FIG. 6 is a block diagram illustrating data processing components of a computing device, according to an example embodiment.

FIGS. 3 and 6 depict example embodiments of computing device components (e.g., functional elements of a computing device) that may be included in printing device 20. Referring first to FIG. 3, an example image data encoder 40 is illustrated. The encoder 40 is configured to receive image data 42. In the illustrated example, the image data is divided into image data blocks (e.g., 8×8 pixel blocks), and the image data blocks are provided to a spatial frequency converter 44 of the encoder 40. The spatial frequency converter performs spatial frequency conversion, such as by executing a discrete cosine transform (DCT) on the image data. Performing the spatial frequency conversion on the image data results in a set of one or more frequency coefficients that represent the spatial frequency conversion of the image data block. In the example of an 8×8 pixel block, the spatial frequency converter 44 is configured to produce between one and sixty-four frequency coefficients in a single clock cycle. Referring to FIG. 4, in one example, these resulting frequency coefficients $S_{uv}$ may be stored in a storage component 60. In another example, a resulting set of one to sixty-four frequency coefficients $S_{uv}$ need not be stored separately, but are operated upon in a single operation (e.g., a single clock cycle) by a quantizer and data sequencer.

For instance, the set of one to sixty-four frequency coefficients may then be immediately operated upon by a quantizer 46. The quantizer 46 generates quantized data, such as a set of one or more quantized frequency coefficients. Generally, quantization is a process for reducing or eliminating high frequency components after the image data has been transformed into the frequency domain by the spatial frequency conversion operation. The quantizer 46 operates on the frequency coefficients using a quantization table that includes quantization factors. More particularly, in the encoder 40, the quantizer divides the frequency coefficients $S_{uv}$ by corresponding quantization factors to generate the set of quantized frequency coefficients. FIG. 4 illustrates an example where the quantization factors $Q_{uv}$ may be stored in a storage component 62 or otherwise made available as inputs to the quantizer where one or up to sixty-four quantization factors $Q_{uv}$ are available per clock cycle. The quantizer 46 may also round the result of the division operation to eliminate insignificant high frequency components.

Figure 5:
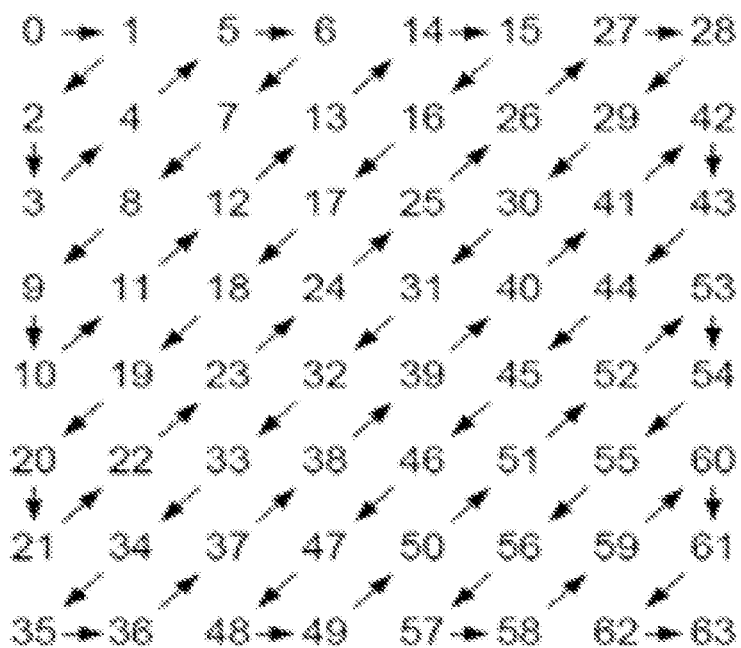
FIG. 5 is an example of a predetermined data sequence for an 8×8 data block.

In the present example, the set of quantized frequency coefficients $Sq_{uv}$ produced by the quantizer 46 may then be provided immediately, in a single operation or single clock cycle, to a data sequencer 48. The data sequencer 48 is configured to arrange the set of quantized frequency coefficients in a predetermined sequence. One such sequence is a zig-zag sequence that is illustrated by FIG. 5. FIG. 4 also illustrates a block 64 that represents hardware and/or software components that execute the zig-zag sequencing operation.

The resulting set of quantized frequency coefficients arranged in the predetermined sequence $Sq_{uv}$ may be stored in a storage component 66. In another example, the resulting set of one to sixty-four quantized frequency coefficients $Sq_{uv}$ need not be stored separately, but are operated upon in a single operation (e.g., a single clock cycle) by a data encoder 50. The data encoder 50 performs entropy or Huffman coding on the extracted, quantized frequency coefficients $Sq_{uv}$ to provide encoded data 52 for storage, transfer, or other processing.

Figure 7:
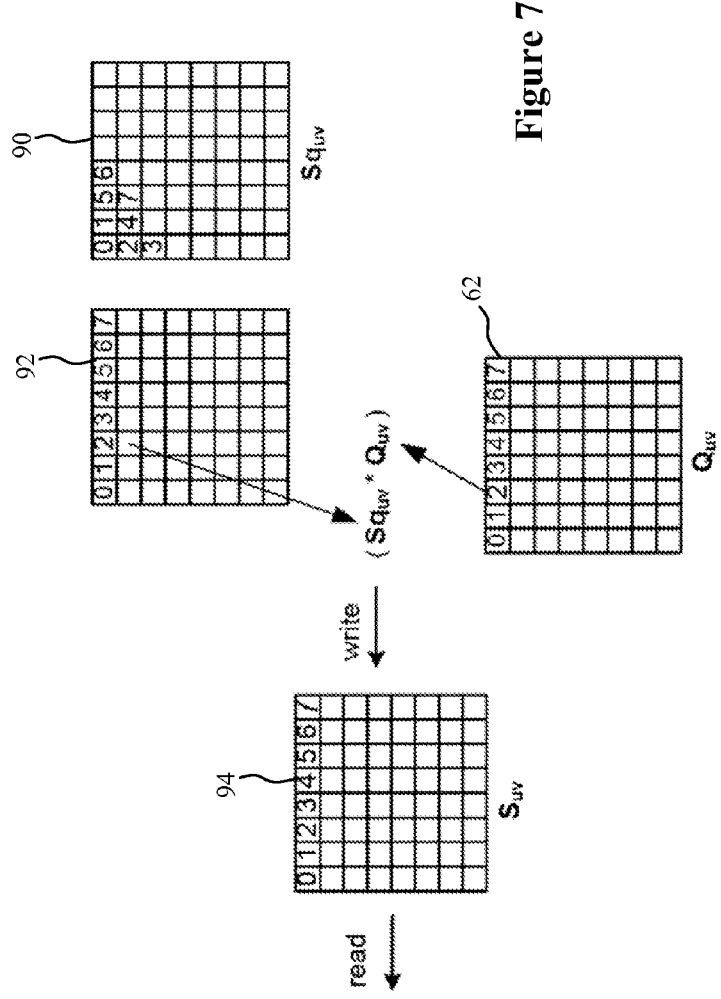
FIG. 7 is a block diagram illustrating storage components and data for use in image processing, according to an example embodiment.

Referring now to FIGS. 6 and 7, an example image data decoder 70 is illustrated. The decoder 70 is configured to receive encoded image data 52 (such as the encoded data of FIG. 3). In the illustrated example, the encoded data is provided immediately to a data decoder 72. The data decoder 72 performs the inverse function of the data encoder 50, e.g., an inverse entropy or Huffman decoding to produce quantized frequency coefficients $Sq_{uv}$. In the example of an 8×8 pixel block, the data decoder 72 is configured to produce between one and sixty-four quantized frequency coefficients $Sq_{uv}$ in a single clock cycle. The number of coefficients $Sq_{uv}$ may depend, in part, on the received encoded image data. In FIG. 7, in one example, the resulting quantized frequency coefficients $Sq_{uv}$ may be stored in a storage component 90. In another example, a resulting set of one to sixty-four quantized frequency coefficients $Sq_{uv}$ need not be stored separately, but are operated upon in a single operation (e.g., a single clock cycle) by a data inverse sequencer and a de-quantizer, as will be described in more detail hereinafter.

In the present example, the set of one to sixty-four quantized frequency coefficients $Sq_{uv}$ may be arranged in the predetermined sequence resulting from the operation of the data sequencer 48 of FIG. 3. Accordingly, the quantized frequency coefficients $Sq_{uv}$ may be provided to a data inverse sequencer 74, which arranges the quantized frequency coefficients $Sq_{uv}$ in an inverse of the predetermined sequence. Referring to FIG. 7, in one example, the resulting re-arranged quantized frequency coefficients $Sq_{uv}$ may be stored in a storage component 92.

In another example, the resulting re-arranged quantized frequency coefficients $Sq_{uv}$ need not be stored separately, and after the data inverse sequencer 74, the quantized frequency coefficients $Sq_{uv}$ are provided immediately to a de-quantizer 76, which de-quantizes the quantized frequency coefficients $Sq_{uv}$. In one example, the de-quantizer 76 uses the same quantization table and quantization factor as discussed above in relation to the quantizer 46 of FIG. 3. However, the de-quantizer 76 multiplies the quantized frequency coefficients $Sq_{uv}$ with corresponding quantization factors $Q_{uv}$ and performs an inverse of the rounding performed by the quantizer 46 to extract the frequency coefficients $S_{uv}$, which may be stored in a storage component 94 or provided immediately to an inverse spatial frequency converter 78. The inverse spatial frequency converter 78 performs an inverse of the spatial frequency conversion performed by the converter 44 of FIG. 3 in order to extract the original image data 42 for display, printing, or other processing.

4. Example Decoder System

Figure 8:
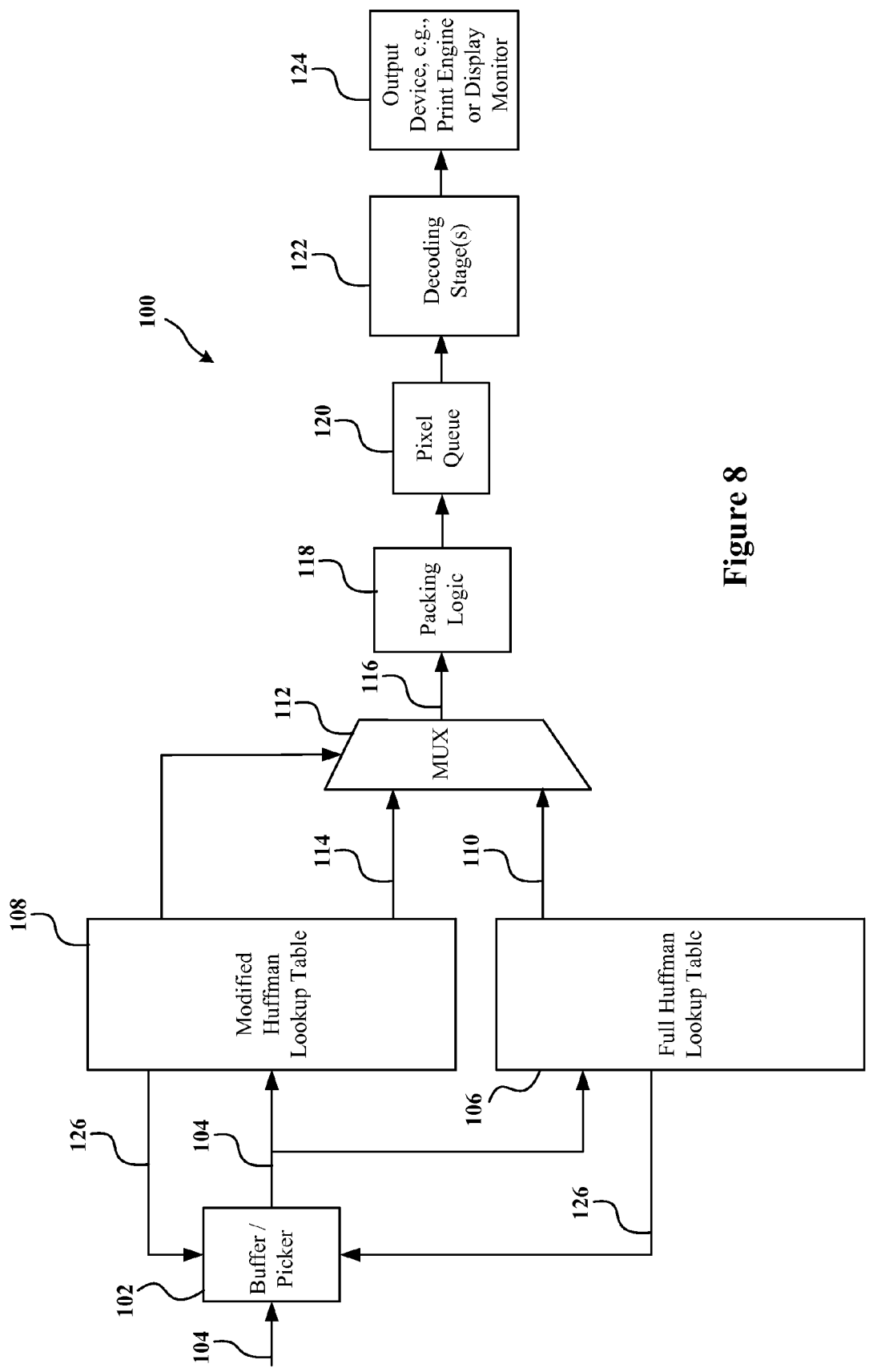
FIG. 8 depicts a block diagram of a data decoder system in accordance with an example embodiment.

Referring now to FIG. 8, an example decoder system 100 is illustrated. In FIG. 8, the system 100 includes a buffer component 102 that is configured to receive an incoming data stream 104 that includes a series of variable length code words that encode a respective series of pixel data (e.g., DCT coefficients) according to an entropy coding lookup table. In one example, the first entropy coding lookup table is the JPEG Huffman lookup table including all 160 entries. From the buffer 102, the data stream 104 (or sequential portions thereof) is provided for processing by a block 106 (e.g., a processor or processing logic) that uses a first coding lookup table (e.g., the same "full" entropy coding lookup table used to encode the pixel data), and for processing by a block 108 (e.g., the same or different processor or processing logic from block 106) that uses a second coding lookup table.

In this example, the second coding lookup table is a modified version of the first entropy coding lookup table and includes a plurality of entries that each comprises a pair of a first code word and a second code word. For instance, the first code word of each pair is selected from one or more entries of the first lookup table that correspond to a run of zero, and the second code word of each pair is selected from one or more entries of the first lookup table that correspond to a run of zero or a run of one. Referring to the JPEG Huffman lookup table, there are ten code words that correspond to a run of zero and ten code words that correspond to a run of one. In this example, the second coding lookup table includes each combination of run of zero code words followed by run of zero code words or run of one code words. Based on the JPEG Huffman lookup table, such a modified, second coding lookup table would include 200 entries generally as follows:

(Run of zero code words followed by run of zero code words)
    0/1_0/1, 0/1_0/2, . . . , 0/1_0/A,
    0/2_0/1, 0/2_0/2, . . . , 0/2_0/A,
    0/3_0/1, 0/3_0/2, . . . , 0/3_0/A,
    . . .
    0/A_0/1, 0/A_0/2, . . . , 0/A_0/A, (Run of zero code words followed by run of one code words)
    0/1_1/1, 0/1_1/2, . . . , 0/1_1/A,
    0/2_1/1, 0/2_1/2, . . . , 0/2_1/A,
    0/3_1/1, 0/3_1/2, . . . , 0/3_1/A,
    . . .
    0/A_1/1, 0/A_1/2, . . . , 0/A_1/A, The first and second coding lookup tables blocks 106, 108 process the data stream 104 in parallel to identify matches between code words in the received data stream and entries of the respective lookup tables. The block 106 processes the data stream 104 one code word at a time to find a matching code word entry in the first coding lookup table and provides, as an output 110, the matching code word to a selector component 112. The selector component 112 may be a priority based multiplexer or other hardware and/or software components configured to selectively provide an output from a plurality of inputs.

The block 108 processes the data stream 104 using the second coding lookup table to determine whether the data stream includes consecutive code words that correspond to a run of zero followed by a run of zero or a run of one. If the block 108 determines that there is a match between consecutive code words in the data stream, and a code word entry in the second coding lookup table, the block provides, as an output 114, the matching pair of code words to the selector component 112. If the block 108 determines that there is a match, the block 108 provides a priority signal that instructs the selector component 112 to selectively provide an output 116 based on the output 114. If the block 108 determines that there is not match, the block does not provide the priority signal (or otherwise provides a different signal), which then instructs the selector component 112 to selectively provide the output 116 based on the output 110.

In the example of FIG. 8, a packing logic block 118 receives the output 116 from the selector component 112, and is configured to pack the variable length code word output 110 from block 106 or the variable length code word pair output 114 from block 108 in a pixel queue 120, which may be a fixed-length queue. The system 100 of FIG. 8 also includes one or more decoding stages 122 that are configured to perform functions, such as inverse data sequencing, dequantizing, inverse spatial frequency conversion, and the like. Further, in the example of FIG. 8, an output device 124 is coupled to the decoding stage(s) 122. In the present example, the output device 124 may be a print engine configured to translate the contents of the pixel queue 120, as processed by the decoding stage(s) 122, into control signals for printing a corresponding portion of an image. The output device 124 may also include some other display device, such as a display monitor, that is configured to translate the contents of the pixel queue 120 into control signals for displaying a corresponding portion of an image.

In the system 100, the blocks 106, 108 may also be configured to provide a feedback output 126 coupled to the buffer 102, which also can function as a hardware and/or software based picker block. More particularly, when the blocks 106, 108 identify a variable length code word in the data stream 104, the blocks may generate the feedback output 126 to inform the picker block 102 of the length of the code word. The picker block 102 may then shift a moving window of bits to provide a next sequential portion of the data stream to the blocks 106, 108 for processing.

5. Example Operation

Figure 9:
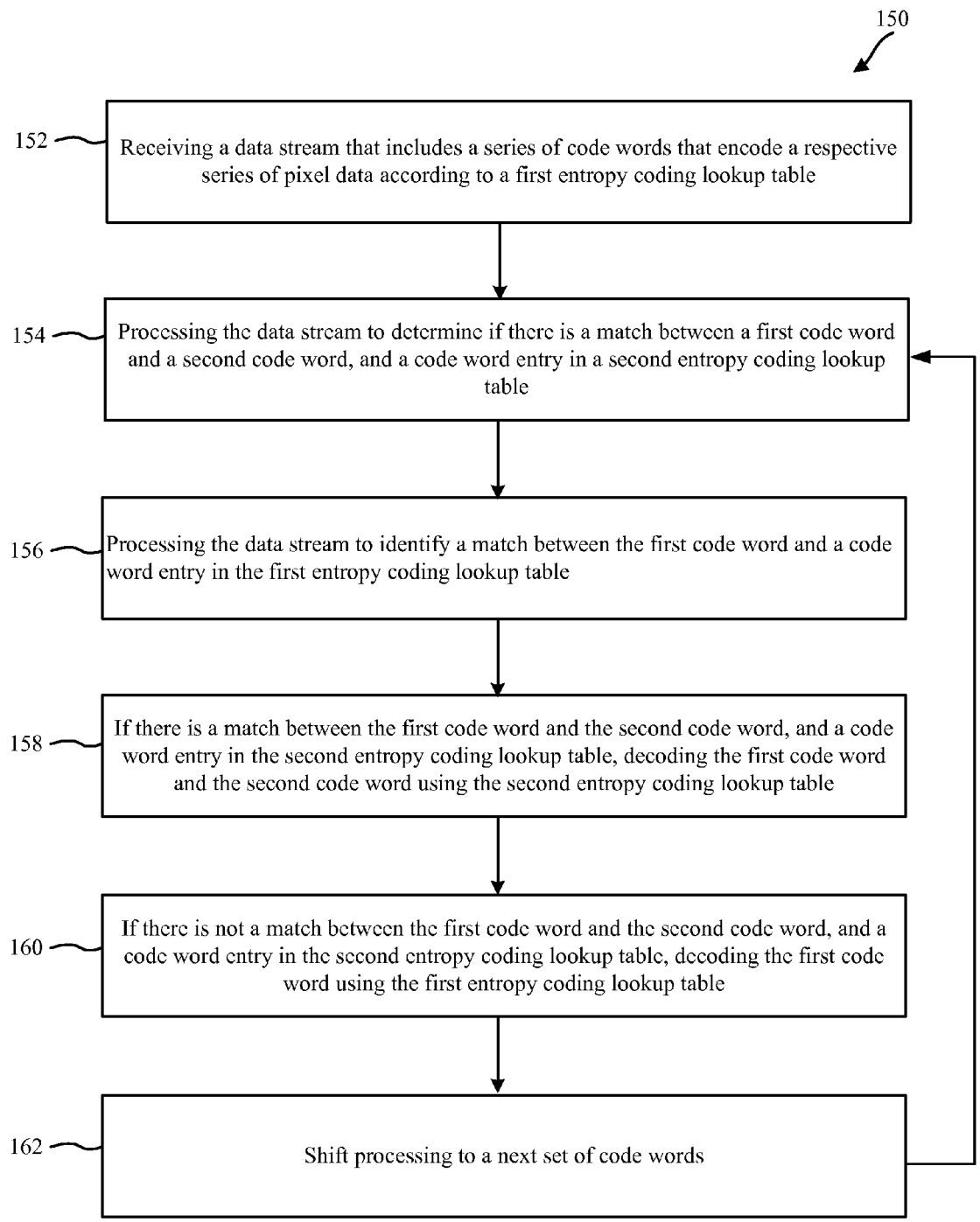
FIG. 9 depicts a method of decoding data in accordance with an example embodiment.

In addition to the above description, FIG. 9 illustrates a flow chart of an example embodiment. The steps illustrated by this flow chart may be carried out by one or more computing devices, systems, or components thereof, such as printing device 20, decoder 72, and system 100. Further, aspects of each individual step may be distributed between multiple computing devices, as appropriate.

FIG. 9 illustrates an example encoding process 150 that can use the components of FIGS. 6 and 8, for example. In the process 150 at block 152, the system 100, for example, receives a data stream that includes code words that encode a respective series of pixel data according to a first entropy encoding lookup table. For instance, the first entropy encoding lookup table can be the JPEG Huffman lookup table described herein.

At block 154, the system 100 processes the data stream to determine if there is a match between a first code word and a second code word, and a code word entry in a second entropy coding lookup table. In the present example, the first code word and the second code word are consecutive code words in the data stream, and the second entropy coding lookup table can be the modified coding lookup table used by the second coding lookup table block 108 of FIG. 8. At block 156, the system 100 processes the data stream to identify a match between the first code word and a code word entry in the first entropy coding lookup table. In one example, this processing at block 156 is performed in parallel with the processing of block 154.

At block 158, if there is a match between the first code word and the second code word, and a code word entry in the second entropy coding lookup table, the system 100 decodes or otherwise provides as an output the first code word and the second code word using the second entropy coding lookup table. At block 160, if there is not a match between the first code word and the second code word and a code word entry in the second entropy coding lookup table, the system 100 decodes or otherwise provides as an output the first code word using the first entropy coding lookup table.

In the example of FIG. 9, at block 162, the system 100 shifts processing to a next set of code words. In accordance with one embodiment, if the system 100 does not identify a match at block 154, then at block 162, the system 100 shifts processing by one code word, and control passes back to block 154 to continue processing the received data stream. Consequently, at a next iteration of block 154 the system 100 determines if there is a match between the second code word and a next consecutive (third) code word, and a code word entry in the second entropy coding lookup table. Further, at a next iteration of block 156 the system 100 processes the data stream to identify a match between the second code word and a code word entry in the first entropy coding lookup table. Thereafter, at block 158, if there is a match between the second code word and the third code word, and a code word entry in the second entropy coding lookup table, the system 100 decodes or otherwise provides as an output the second code word and the third code word using the second entropy coding lookup table. At block 160, if there is not a match between the second code word and the third code word and a code word entry in the second entropy coding lookup table, the system 100 decodes or otherwise provides as an output the second code word using the first entropy coding lookup table.

Referring again to block 162, in accordance with the present embodiment, if the system 100 does identify a match at block 154, then at block 162, the system 100 shifts processing by two code words, and control passes back to block 154 to continue processing the received data stream. Consequently, at a next iteration of block 154 the system 100 determines if there is a match between a next consecutive pair of code words (e.g., third and fourth code words), and a code word entry in the second entropy coding lookup table. Further, at a next iteration of block 156 the system 100 processes the data stream to identify a match between the third code word and a code word entry in the first entropy coding lookup table. Thereafter, at block 158, if there is a match between the third code word and the fourth code word, and a code word entry in the second entropy coding lookup table, the system 100 decodes or otherwise provides as an output the third code word and the fourth code word using the second entropy coding lookup table. At block 160, if there is not a match between the third code word and the fourth code word and a code word entry in the second entropy coding lookup table, the system 100 decodes or otherwise provides as an output the third code word using the first entropy coding lookup table.

Generally, the processing at block 162 provides a moving window that traverses sequentially through the data stream as code words are decoded and provided to an output.

6. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

APPENDIX

TABLE K.5

Table for luminance AC coefficients

| Run/Size | Code length | Code word |
|---|---|---|
| 0/0 (EOB) | 4 | 1010 |
| 0/1 | 2 | 00 |
| 0/2 | 2 | 01 |
| 0/3 | 3 | 100 |
| 0/4 | 4 | 1011 |
| 0/5 | 5 | 11010 |
| 0/6 | 7 | 1111000 |
| 0/7 | 8 | 11111000 |
| 0/8 | 10 | 1111110110 |
| 0/9 | 16 | 1111111110000010 |
| 0/A | 16 | 1111111110000011 |
| 1/1 | 4 | 1100 |
| 1/2 | 5 | 11011 |
| 1/3 | 7 | 1111001 |
| 1/4 | 9 | 111110110 |
| 1/5 | 11 | 11111110110 |
| 1/6 | 16 | 1111111110000100 |
| 1/7 | 16 | 1111111110000101 |
| 1/8 | 16 | 1111111110000110 |
| 1/9 | 16 | 1111111110000111 |
| 1/A | 16 | 1111111110001000 |
| 2/1 | 5 | 11100 |
| 2/2 | 8 | 11111001 |
| 2/3 | 10 | 1111110111 |
| 2/4 | 12 | 111111110100 |
| 2/5 | 16 | 1111111110001001 |
| 2/6 | 16 | 1111111110001010 |
| 2/7 | 16 | 1111111110001011 |
| 2/8 | 16 | 1111111110001100 |
| 2/9 | 16 | 1111111110001101 |
| 2/A | 16 | 1111111110001110 |
| 3/1 | 6 | 111010 |
| 3/2 | 9 | 111110111 |
| 3/3 | 12 | 111111110101 |
| 3/4 | 16 | 1111111110001111 |
| 3/5 | 16 | 1111111110010000 |
| 3/6 | 16 | 1111111110010001 |
| 3/7 | 16 | 1111111110010010 |
| 3/8 | 16 | 1111111110010011 |
| 3/9 | 16 | 1111111110010100 |
| 3/A | 16 | 1111111110010101 |
| 4/1 | 6 | 111011 |
| 4/2 | 10 | 1111111000 |
| 4/3 | 16 | 1111111110010110 |
| 4/4 | 16 | 1111111110010111 |
| 4/5 | 16 | 1111111110011000 |
| 4/6 | 16 | 1111111110011001 |
| 4/7 | 16 | 1111111110011010 |
| 4/8 | 16 | 1111111110011011 |
| 4/9 | 16 | 1111111110011100 |
| 4/A | 16 | 1111111110011101 |
| 5/1 | 7 | 1111010 |
| 5/2 | 11 | 11111110111 |
| 5/3 | 16 | 1111111110011110 |
| 5/4 | 16 | 1111111110011111 |
| 5/5 | 16 | 1111111110100000 |
| 5/6 | 16 | 1111111110100001 |
| 5/7 | 16 | 1111111110100010 |
| 5/8 | 16 | 1111111110100011 |
| 5/9 | 16 | 1111111110100100 |
| 5/A | 16 | 1111111110100101 |
| 6/1 | 7 | 1111011 |
| 6/2 | 12 | 111111110110 |
| 6/3 | 16 | 1111111110100110 |
| 6/4 | 16 | 1111111110100111 |
| 6/5 | 16 | 1111111110101000 |
| 6/6 | 16 | 1111111110101001 |
| 6/7 | 16 | 1111111110101010 |
| 6/8 | 16 | 1111111110101011 |
| 6/9 | 16 | 1111111110101100 |
| 6/A | 16 | 1111111110101101 |
| 7/1 | 8 | 11111010 |
| 7/2 | 12 | 111111110111 |
| 7/3 | 16 | 1111111110101110 |
| 7/4 | 16 | 1111111110101111 |
| 7/5 | 16 | 1111111110110000 |
| 7/6 | 16 | 1111111110110001 |
| 7/7 | 16 | 1111111110110010 |
| 7/8 | 16 | 1111111110110011 |
| 7/9 | 16 | 1111111110110100 |
| 7/A | 16 | 1111111110110101 |
| 8/1 | 9 | 111111000 |
| 8/2 | 15 | 111111111000000 |
| 8/3 | 16 | 1111111110110110 |
| 8/4 | 16 | 1111111110110111 |
| 8/5 | 16 | 1111111110111000 |
| 8/6 | 16 | 1111111110111001 |
| 8/7 | 16 | 1111111110111010 |
| 8/8 | 16 | 1111111110111011 |
| 8/9 | 16 | 1111111110111100 |
| 8/A | 16 | 1111111110111101 |
| 9/1 | 9 | 111111001 |
| 9/2 | 16 | 1111111110111110 |
| 9/3 | 16 | 1111111110111111 |
| 9/4 | 16 | 1111111111000000 |
| 9/5 | 16 | 1111111111000001 |
| 9/6 | 16 | 1111111111000010 |
| 9/7 | 16 | 1111111111000011 |
| 9/8 | 16 | 1111111111000100 |
| 9/9 | 16 | 1111111111000101 |
| 9/A | 16 | 1111111111000110 |
| A/1 | 9 | 111111010 |
| A/2 | 16 | 1111111111000111 |
| A/3 | 16 | 1111111111001000 |
| A/4 | 16 | 1111111111001001 |
| A/5 | 16 | 1111111111001010 |
| A/6 | 16 | 1111111111001011 |
| A/7 | 16 | 1111111111001100 |
| A/8 | 16 | 1111111111001101 |
| A/9 | 16 | 1111111111001110 |
| A/A | 16 | 1111111111001111 |
| B/1 | 10 | 1111111001 |
| B/2 | 16 | 1111111111010000 |
| B/3 | 16 | 1111111111010001 |
| B/4 | 16 | 1111111111010010 |
| B/5 | 16 | 1111111111010011 |
| B/6 | 16 | 1111111111010100 |
| B/7 | 16 | 1111111111010101 |
| B/8 | 16 | 1111111111010110 |
| B/9 | 16 | 1111111111010111 |
| B/A | 16 | 1111111111011000 |
| C/1 | 10 | 1111111010 |
| C/2 | 16 | 1111111111011001 |
| C/3 | 16 | 1111111111011010 |
| C/4 | 16 | 1111111111011011 |
| C/5 | 16 | 1111111111011100 |
| C/6 | 16 | 1111111111011101 |
| C/7 | 16 | 1111111111011110 |
| C/8 | 16 | 1111111111011111 |
| C/9 | 16 | 1111111111100000 |
| C/A | 16 | 1111111111100001 |
| D/1 | 11 | 11111111000 |
| D/2 | 16 | 1111111111100010 |
| D/3 | 16 | 1111111111100011 |
| D/4 | 16 | 1111111111100100 |
| D/5 | 16 | 1111111111100101 |
| D/6 | 16 | 1111111111100110 |
| D/7 | 16 | 1111111111100111 |
| D/8 | 16 | 1111111111101000 |
| D/9 | 16 | 1111111111101001 |
| D/A | 16 | 1111111111101010 |
| E/1 | 16 | 1111111111101011 |
| E/2 | 16 | 1111111111101100 |
| E/3 | 16 | 1111111111101101 |
| E/4 | 16 | 1111111111101110 |
| E/5 | 16 | 1111111111101111 |
| E/6 | 16 | 1111111111110000 |
| E/7 | 16 | 1111111111110001 |

TABLE K.5-continued

Table for luminance AC coefficients

| Run/Size | Code length | Code word |
|---|---|---|
| E/8 | 16 | 1111111111110010 |
| E/9 | 16 | 1111111111110011 |
| E/A | 16 | 1111111111110100 |
| F/0 (ZRL) | 11 | 11111111001 |
| F/1 | 16 | 1111111111110101 |
| F/2 | 16 | 1111111111110110 |
| F/3 | 16 | 1111111111110111 |
| F/4 | 16 | 1111111111111000 |
| F/5 | 16 | 1111111111111001 |
| F/6 | 16 | 1111111111111010 |
| F/7 | 16 | 1111111111111011 |
| F/8 | 16 | 1111111111111100 |
| F/9 | 16 | 1111111111111101 |
| F/A | 16 | 1111111111111110 |

We claim:

1. A computer-implemented method comprising:
receiving, by a computing device, a data stream that includes a series of code words that encode a respective series of pixel data according to a first entropy coding lookup table;
processing, by the computing device, the data stream to determine if there is a match between a first code word and a second code word, and a code word entry in a second entropy coding lookup table, wherein the first code word and the second code word are consecutive code words in the data stream, and wherein the second entropy coding lookup table is different than the first entropy coding lookup table;
if there is a match between the first code word and the second code word, and a code word entry in the second entropy coding lookup table, decoding, by the computing device, the first code word and the second code word using the second entropy coding lookup table; and
if there is not a match between the first code word and the second code word and a code word entry in the second entropy coding lookup table, decoding, by the computing device, the first code word using the first entropy coding lookup table.

2. The method of claim 1, further comprising processing, by the computing device, the data stream to identify a match between the first code word and a code word entry in the first entropy coding lookup table, wherein the computing device performs processing of the data stream to identify a match between the first code word and a code word entry in the first entropy coding lookup table in parallel with processing of the data stream to determine if there is a match between the first code word and the second code word, and a code word entry in the second entropy coding lookup table.

3. The method of claim 1, wherein the second entropy coding lookup table includes at least a plurality of entries that each comprises a pair of a first code word and a second code word, wherein the first code word of each pair is selected from one or more entries of the first entropy coding lookup table that correspond to a run of zero, and the second code word of each pair is selected from one or more entries of the first entropy coding lookup table that correspond to a run of zero or a run of one.

4. The method of claim 3, wherein the second entropy coding lookup table includes each unique combination of pairs of the first code word and the second code word.

5. The method of claim 1, further comprising:
if there is a match between the first code word and the second code word, and a code word entry in the second entropy coding lookup table, processing, by the computing device, the data stream to determine if there is a match between a third code word and a fourth code word, and a code word entry in the second entropy coding lookup table, wherein the first, second, third, and fourth code words are consecutive code words in the data stream.

6. The method of claim 5, further comprising:
if there is (i) a match between the first code word and the second code word, and a code word entry in the second entropy coding lookup table, and (ii) a match between the third code word and the fourth code word, and a code word entry in the second entropy coding lookup table, decoding, by the computing device, the third code word and the fourth code word using the second entropy coding lookup table; and
if there is (i) a match between the first code word and the second code word, and a code word entry in the second entropy coding lookup table, and if there is (ii) not a match between the third code word and the fourth code word and a code word entry in the second entropy coding lookup table, decoding, by the computing device, the third code word using the first entropy coding lookup table.

7. The method of claim 1, further comprising:
if there is not a match between the first code word and the second code word, and a code word entry in the second entropy coding lookup table, processing, by the computing device, the data stream to determine if there is a match between the second code word and a third code word, and a code word entry in the second entropy coding lookup table, wherein the second and third code words are consecutive code words in the data stream.

8. The method of claim 7, further comprising:
if there is (i) not a match between the first code word and the second code word, and a code word entry in the second entropy coding lookup table, and if there is (ii) a match between the second code word and the third code word, and a code word entry in the second entropy coding lookup table, decoding, by the computing device, the second code word and the third code word using the second entropy coding lookup table; and
if there is (i) not a match between the first code word and the second code word, and a code word entry in the second entropy coding lookup table, and if there is (ii) not a match between the second code word and the third code word, and a code word entry in the second entropy coding lookup table, decoding, by the computing device, the second code word using the first entropy coding lookup table.

9. The method of claim 1, wherein decoding the first code word and the second code word using the second entropy coding lookup table guarantees an average two pixel per clock cycle throughput.

10. The method of claim 1, wherein the first entropy coding lookup table is a Huffman entropy coding lookup table.

11. The method of claim 1, further comprising providing, based on the decoding of the first code word or the first code word and the second code word, an output data stream to one or more of a print engine or a display monitor.

12. The method of claim 11, further comprising dequantizing the output data stream and performing an inverse spatial frequency conversion on the output data stream before providing the output data stream to one or more of the print engine or the display monitor.

13. A system for decoding a data stream comprising:
an input buffer for receiving the data stream, wherein the data stream includes data encoded into a series of code words according to an entropy coding lookup table; and
a processor coupled to the input buffer and configured to:
determine if consecutive code words in the data stream correspond to a run of zero followed by a run of zero or a run of one;
if the consecutive code words correspond to a run of zero followed by a run of zero or a run of one, provide an output based at least in part on decoding the consecutive code words using a modified entropy coding lookup table; and
if the consecutive code words do not correspond to a run of zero followed by a run of zero or a run of one, provide the output based at least in part on decoding a first code word of the consecutive code words using the entropy coding lookup table.

14. The system of claim 13, wherein the modified entropy coding lookup table includes at least a plurality of entries that each comprises a pair of a first code word and a second code word, wherein the first code word of each pair is selected from one or more entries of the entropy coding lookup table that correspond to a run of zero, and the second code word of each pair is selected from one or more entries of the entropy coding lookup table that correspond to a run of zero or a run of one.

15. The system of claim 13, wherein providing the output based at least in part on decoding the consecutive code words using the modified entropy coding lookup table guarantees an average two pixel per clock cycle throughput.

16. The system of claim 13, wherein the entropy coding lookup table is a Huffman entropy coding lookup table.

17. The system of claim 13, wherein the input buffer and the processor are included in a printing device.

18. A non-transitory computer-readable medium, having stored thereon program instructions that, upon execution by a processor cause performance of a set of acts comprising:
receiving, by a computing device, a data stream that includes a series of code words that encodes a respective series of pixel data according to a first entropy coding lookup table;
processing the data stream to determine if there is a match between a first code word and a second code word, and a code word entry in a second entropy coding lookup table, wherein the first code word and the second code word are consecutive code words in the data stream, and wherein the second entropy coding lookup table is different than the first entropy coding lookup table;
if there is a match between the first code word and the second code word, and a code word entry in the second entropy coding lookup table, decoding the first code word and the second code word using the second entropy coding lookup table; and
if there is not a match between the first code word and the second code word and a code word entry in the second entropy coding lookup table, decoding the first code word using the first entropy coding lookup table.

19. The non-transitory computer-readable medium of claim 18, the set of acts further comprising:
processing the data stream to identify a match between the first code word and a code word entry in the first entropy coding lookup table, wherein processing of the data stream to identify a match between the first code word and a code word entry in the first entropy coding lookup table is performed in parallel with processing of the data stream to determine if there is a match between the first code word and the second code word, and a code word entry in the second entropy coding lookup table.

20. The non-transitory computer-readable medium of claim 18, wherein the second entropy coding lookup table includes at least a plurality of entries that each comprises a pair of a first code word and a second code word, wherein the first code word of each pair is selected from one or more entries of the first entropy coding lookup table that correspond to a run of zero, and the second code word of each pair is selected from one or more entries of the first entropy coding lookup table that correspond to a run of zero or a run of one.

* * * * *